(12) United States Patent
Dong

(10) Patent No.: US 9,988,285 B2
(45) Date of Patent: Jun. 5, 2018

(54) FILTER MATERIAL HAVING A FUNCTION OF ADSORBING AND FIXING ARSENIC AND HEAVY METALS

(71) Applicant: SUZHOU MICRO CERAMICS HEAVY METAL FILTER TECHNOLOGY CO., LTD., Suzhou, Jiangsu (CN)

(72) Inventor: Liangjie Dong, Suzhou (CN)

(73) Assignee: SUZHOU MICRO CERAMICS HEAVY METAL FILTER TECHNOLOGY CO., LTD., Suzhou (CN)

(*) Notice: Subject to any disclaimer, the term of this patent is extended or adjusted under 35 U.S.C. 154(b) by 133 days.

(21) Appl. No.: 14/781,395

(22) PCT Filed: Sep. 2, 2013

(86) PCT No.: PCT/CN2013/082818
§ 371 (c)(1),
(2) Date: Sep. 30, 2015

(87) PCT Pub. No.: WO2015/003428
PCT Pub. Date: Jan. 15, 2015

(65) Prior Publication Data
US 2016/0052800 A1   Feb. 25, 2016

(30) Foreign Application Priority Data
Jul. 12, 2013 (CN) .......................... 2013 1 0292656

(51) Int. Cl.
*C02F 1/28* (2006.01)
*B01J 20/02* (2006.01)
(Continued)

(52) U.S. Cl.
CPC ............... *C02F 1/288* (2013.01); *B01J 20/02* (2013.01); *B01J 20/12* (2013.01); *B01J 20/14* (2013.01);
(Continued)

(58) Field of Classification Search
CPC ...... C02F 1/281; C02F 1/288; C02F 2101/20; C02F 2101/22; C02F 2101/103;
(Continued)

(56) References Cited

U.S. PATENT DOCUMENTS 8,361,920 B2   1/2013   Dong
2008/0311288 A1   12/2008   Dong
(Continued)

FOREIGN PATENT DOCUMENTS

CN   102205419 A   10/2011
CN   101405223 B   8/2012
(Continued)

OTHER PUBLICATIONS

Apr. 30, 2014 International Search Report issued in International Patent Application No. PCT/CN2013/082818.

*Primary Examiner* — Matthew O Savage
(74) *Attorney, Agent, or Firm* — Oliff PLC

(57) ABSTRACT

A filter material having a function of adsorbing and fixing arsenic and heavy metals and usage thereof. The filter material includes a porous ceramic substrate with porosity of 35%-85%, and zero-valent iron nanoparticles formed in situ within the porous ceramic substrate. The porous ceramic substrate has micropores of 2-10 micron, and fluffy amorphous silicon-iron-carbon structure is formed within each micropore. At least 25 wt % of ceramic component constituting the porous ceramic substrate is diatomaceous earth, and the fluffy amorphous silicon-iron-carbon structure within the micropore can form an adsorption film after water
(Continued)

absorption. In the microstructure, the filter material obtained is configured as a porous and fluffy nose-like filter structure and generates an adsorption film, thereby greatly improving adsorption efficiency and adapting to changes in water quality and chemical environment. The used filter material will not fall off and no heavy metal will be separated therefrom, thereby ensuring the security of use.

20 Claims, 4 Drawing Sheets

(51) Int. Cl.
| | | |
|---|---|---|
| *B01J 20/12* | (2006.01) | |
| *B01J 20/20* | (2006.01) | |
| *B01J 20/28* | (2006.01) | |
| *B01J 20/30* | (2006.01) | |
| *B01J 20/32* | (2006.01) | |
| *B05D 1/18* | (2006.01) | |
| *B01J 20/14* | (2006.01) | |
| *C02F 101/22* | (2006.01) | |
| *C02F 101/10* | (2006.01) | |
| *C02F 101/20* | (2006.01) | |

(52) U.S. Cl.
CPC ......... *B01J 20/20* (2013.01); *B01J 20/28007* (2013.01); *B01J 20/28019* (2013.01); *B01J 20/28026* (2013.01); *B01J 20/28054* (2013.01); *B01J 20/3078* (2013.01); *B01J 20/3204* (2013.01); *B01J 20/3236* (2013.01); *B05D 1/18* (2013.01); *C02F 1/281* (2013.01); *C02F 2101/103* (2013.01); *C02F 2101/106* (2013.01); *C02F 2101/20* (2013.01); *C02F 2101/22* (2013.01); *C02F 2305/08* (2013.01)

(58) Field of Classification Search
CPC . C02F 2101/106; C02F 2305/08; B01J 20/02; B01J 20/12; B01J 20/14; B01J 20/20; B01J 20/28007; B01J 20/28019; B01J 20/28026; B01J 20/28054; B01J 20/3078; B01J 20/3204; B01J 20/3236; B05D 1/18
See application file for complete search history.

(56) References Cited

U.S. PATENT DOCUMENTS

| | | | |
|---|---|---|---|
| 2011/0130575 A1 | 6/2011 | Li et al. | |
| 2014/0116949 A1* | 5/2014 | P ........................ | B82Y 30/00 |
| | | | 210/669 |

FOREIGN PATENT DOCUMENTS

| | | |
|---|---|---|
| CN | 103319212 A | 9/2013 |
| CN | 103331143 A | 10/2013 |

* cited by examiner

FILTER MATERIAL HAVING A FUNCTION OF ADSORBING AND FIXING ARSENIC AND HEAVY METALS

FIELD OF THE INVENTION

The present invention relates to the field of preparation of a filter material, and more particularly to a filter material having a function of adsorbing and fixing arsenic and heavy metals, and preparation method and usage thereof, wherein the filter material can effectively remove trivalent arsenic and pentavalent arsenic from fluid such as water.

DESCRIPTION OF THE RELATED ART

Arsenic is one of the highly toxic elements, and is also the inorganic toxin needed to be removed mainly in standards of drinking water in various countries of the world. Generally arsenic is present in natural water in trivalent or pentavalent state, however, as a metallic element, arsenic is present in the form of arsenite or arsenate instead of the ordinary cations. Currently the filtering requirements of arsenic can not be met because the removal rate of trivalent arsenic is only 50% approximately even if the modern technology is utilized such as reverse osmosis membrane (RO). Furthermore, the filter material is used to filter arsenic and extremely poisonous heavy metals, thus, the problem of fixing shall be taken into account.

In one hand, in the conventional porous ceramics and ceramic filter, bacteria and macromolecular organics may be removed by means of the natural porous structure of diatomaceous earth, but arsenic in ionic state and heavy metals can not be removed. In the other hand, zero-valent iron/nanoscale zero-valent iron slowly corrodes and contributes two free radicals in water of low pH (less than 6) for the reduction and co-precipitation of arsenic and heavy metals, thereby removing the heavy metals. However, the following problems are arisen from the separate application of zero-valent iron: firstly, the corrosion reaction only occurs in the environment of pH less than 7, and the adjusting and controlling of pH is limited by the application of the filtering of drinking water; secondly, the reaction is continuous provided that a certain amount of dissolved oxygen (greater than 2 mg/L) is present; thirdly, harmful sludge is formed during reaction so that heavy metals can not be fixed, thus, further harmless disposal is required; fourthly, lots of redundant trivalent or ferrous ions are generated during usage such that water becomes red or orange and thus needs to be further processed.

In order to solve these problems limiting the application of zero-valent iron, in some studies zero-valent iron or nano-scale zero-valent iron is formed as a coating on porous ceramic particles prepared by activated carbon, natural diatomite or kaolin. However, some problems exist in this method, for example, the coating prepared by activated carbon mixing method will easily fall off if pH value or water quality changes, and this will lead to acute poisoning. Furthermore, the problems of falling off of zero-valent iron powder and surface oxidation easily occur in the filter material, thereby decreasing the adsorbability of the filter material.

China invention patent ZL 200680052402.x disclose a method and composition for removing arsenic and heavy metals from water, wherein kaolin ceramic particles are utilized for zero-valent iron coating, arsenic and heavy metals can be effectively removed and heavy metals are fixed on the surface of ceramic. But, in such a method, only the surface structure of ceramic can be utilized, thus, the adsorption efficiency is needed to be further improved.

In conclusion, for the removal of arsenic, the disadvantages of the prior art mainly consist in: the conventional ceramic oxidization roasting only can provide porous structure to physically filter bacteria and macromolecular; the usage of lots of zero-valent iron power will produce iron ions and hazardous waste; the problem of falling off occurs in the coating of activated carbon and iron power; and only the surface structure can be utilized in the surface coating of ceramic particles.

SUMMARY OF THE INVENTION

One problem to be solved by the invention is to provide a new filter material having the function of arsenic removal, as well as preparation method and usage thereof, for overcoming the shortages of the prior art.

In order to solve the above technical problem, the following technical solution is utilized:

A filter material having a function of adsorbing and fixing arsenic and heavy metals, comprising a porous ceramic substrate with a porosity of 35%-85% and zero-valent iron nanoparticles formed in situ within the porous ceramic substrate, wherein the porous ceramic substrate has micropores of 2-10 micron, a fluffy amorphous silicon-iron-carbon structure containing silicon, the zero-valent iron nanoparticles, and carbon is formed within each micropore and the fluffy amorphous silicon-iron-carbon is able to form a adsorption film after water absorption. At least 25 wt % of the ceramic component constituting the porous ceramic substrate is diatomaceous earth.

According to a specific embodiment of the invention, the surface of the filter material is steel blue or cinereous, a fresh section of the filter material is blue, the filter material becomes black after water absorption or water immersion, and the filter material is able to adsorb the Y25 magnet powder less than 0.1 mm, and the pH value of the filter material is tested as 7.2-8.5 by NY/T 1377-2007 soil standard after the superficial powder being scraped.

According to a preferable embodiment of the invention, the ceramic component constituting the porous ceramic substrate is diatomaceous earth, or any combination of diatomaceous earth and one or two of kaolin and bentonite. Wherein at least 25% of the ceramic component is diatomaceous earth. Preferably, the ceramic component also at least comprises bentonite. These porous ceramic substrates may be prepared by means of any known method.

In one specific embodiment, by weight, the material of the porous ceramic substrate comprises: 55-65 portions of diatomaceous earth, 12-15 portions of calcium-based bentonite, 7-12 portions of carbon powder, 2-3 portions of starch, and 4-6 portions of kaolin.

According to another specific aspect of the invention, by weight, the material of the porous ceramic substrate comprises: 50-55 portions of diatomaceous earth, 6-8 portions of bentonite, 3-4 portions of starch, 3-5 portions of kaolin, 1-2 portions of liquid wax, 1-3 portions of iron powder and 13-15 portions of carbon power.

According to further specific aspect of the invention, by weight, the material of the porous ceramic substrate comprises: 75-85 portions of diatomaceous earth, 8-10 portions of carbon power, 1-3 portions of bentonite, and 3-5 portions of kaolin.

Preferably, the porosity of the porous ceramic substrate is 50-70%.

Preferably, the filter material is obtained by nano-scale iron modifying the porous ceramic substrate, the method of nano-scale iron modifying comprising steps of: adsorbing ferrous ions on the porous ceramic substrate, then utilizing a reducing agent to reduce in situ the ferrous ions adsorbed on the porous ceramic substrate, and finally sintering anaerobically the porous ceramic substrate at 300-500° C.

In another aspect, the invention provides a method for preparing the filter material having a function of adsorbing and fixing arsenic and heavy metals, comprising the steps of:

(1) immersing the porous ceramic substrate in an aqueous mixed solution of pH 7.0-8.0 containing ferrous ions and a tackifier, then taking out the porous ceramic substrate after the porous ceramic substrate being completely wet and exposed to air;

(2) immersing the porous ceramic substrate of the step (1) in an aqueous solution of pH 8.5-9.5 containing 0.1 wt %-5 wt % of sodium borohydride, and taking out the porous ceramic substrate 2-8 mins later and exposed to air; and (3) placing the porous ceramic substrate of the step (2) into an oxygen-free furnace to sinter anaerobically, and heating up to 300° C.-500° C. by a temperature increase rate of 80-100° C./h, then keeping the temperature for 0.5-3 hours to obtain the filter material having a function of adsorbing and fixing arsenic and heavy metals.

Preferably, in the step (1), the tackifier may be selected from the group of glucose, saccharose, soluble starch or any combination thereof, and the content of the tackifier in the aqueous mixed solution is 0.2 wt %-15 wt %.

Preferably, in the step (1), the content of the ferrous ions in the aqueous mixed solution is 0.1 wt %-5 wt %, more preferably 0.2 wt %-2 wt %.

The ferrous ions can be introduced into the solution in the form of ferrous chloride or ferrous sulfate.

Preferably, in the step (2) the content of sodium borohydride in the aqueous solution is 2 wt %-5 wt %.

According to one specific and preferable aspect, in the step (1) pH value is adjusted by sodium citrate.

According to another specific and preferable aspect, in the step (2) pH value is adjusted by tartaric acid.

Preferably, in the step (3), sintering is performed in the atmosphere of nitrogen or hydrogen.

Preferably, in the step (3) the sintering temperature is 380-420° C., more preferably 400° C.

Preferably, in the aqueous solution of the step (2), the content of sodium borohydride is 2 wt %-5 wt %.

In further aspect, the invention also provides a method for removing trivalent arsenic, pentavalent arsenic, and heavy metal ions from water, comprising, a step of passing waste water through a water purifier provided with the filter material having a function of adsorbing, and fixing arsenic and heavy metal.

The heavy metal ions comprise, but not limited to, lead, cadmium, mercury, chromium and the like.

Due to the implementation of the above technical solution, as compared with the prior art the invention has the following advantages:

1. the filter material of the invention has a function of high adsorption and fixing on trivalent and pentavalent arsenic. In the case of contacting water for 15 s, the filter element prepared according to the invention has a removal rate of at least 90% for arsenic, lead, chromium, mercury and manganese ions;

2. the water filtered by the filter material of the invention has stable alkalescence;

3. zero-valent nano-scale iron powder has a microstructure, and has a rapid replacement effect on heavy metal cations, $Fe^0+X^+ \rightarrow Fe^++X$. $Fe^+$ can be fixed on the surface of silicon dioxide in the form of FeOOH, wherein X may be lead, mercury and cadmium ions, but not limited to, these heavy metal ions, and after fixing there is no heavy metal being separated out from the filter material in the case of simulating landfill. The used filter material will not fall off and no heavy metal will be separated therefrom, thereby ensuring the security of use;

4. the filter material of the invention has strong reducibility on hexavalent chromium ions, thus, the toxic hexavalent chromium ions can be reduced to non-toxic and useful trivalent chromium ions.

5. the filter material of the invention also has removal effect of the residual chlorine and by-products of sterilization in water due to it's silicon-iron-carbon structure and active surface of pores. A removal efficiency of 90% can be reached in the case of contacting for 12 s at 1.2 liter per minute;

6. the filter material of the invention primarily is used for filtering water and waste water, and also have filtering effect of gas containing arsenic, mercury or radioactive caesium;

7. the filter material of the invention can be broken into soil conditioner after use to achieve material recycle; and 8. the preparation method of the invention has a mild condition, simple operation and lower cost.

Figure 1:
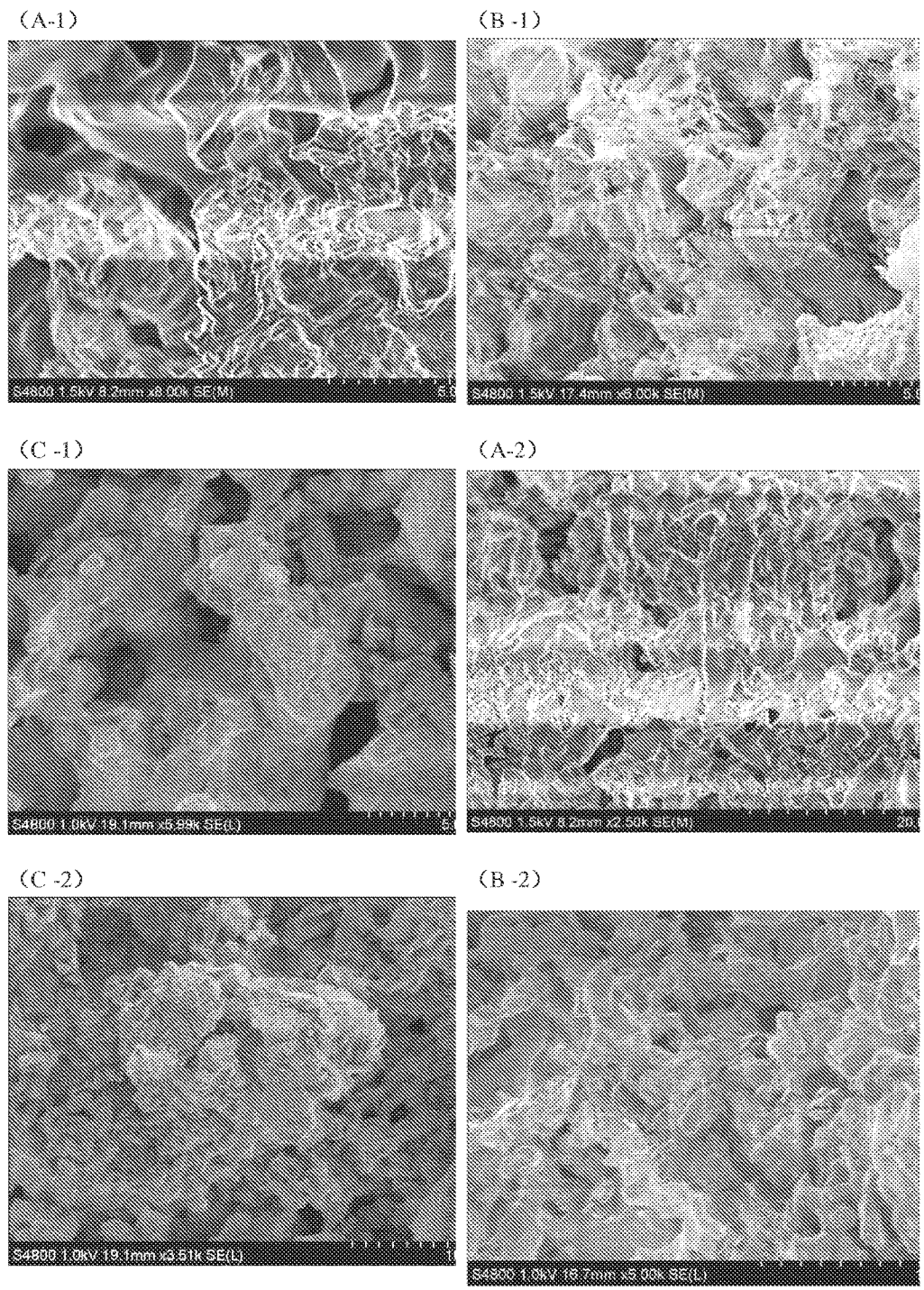
FIG. 1 shows the scanning electron microscope graphs of the porous ceramic substrate and filter material according to embodiment 1.
Figure 1:
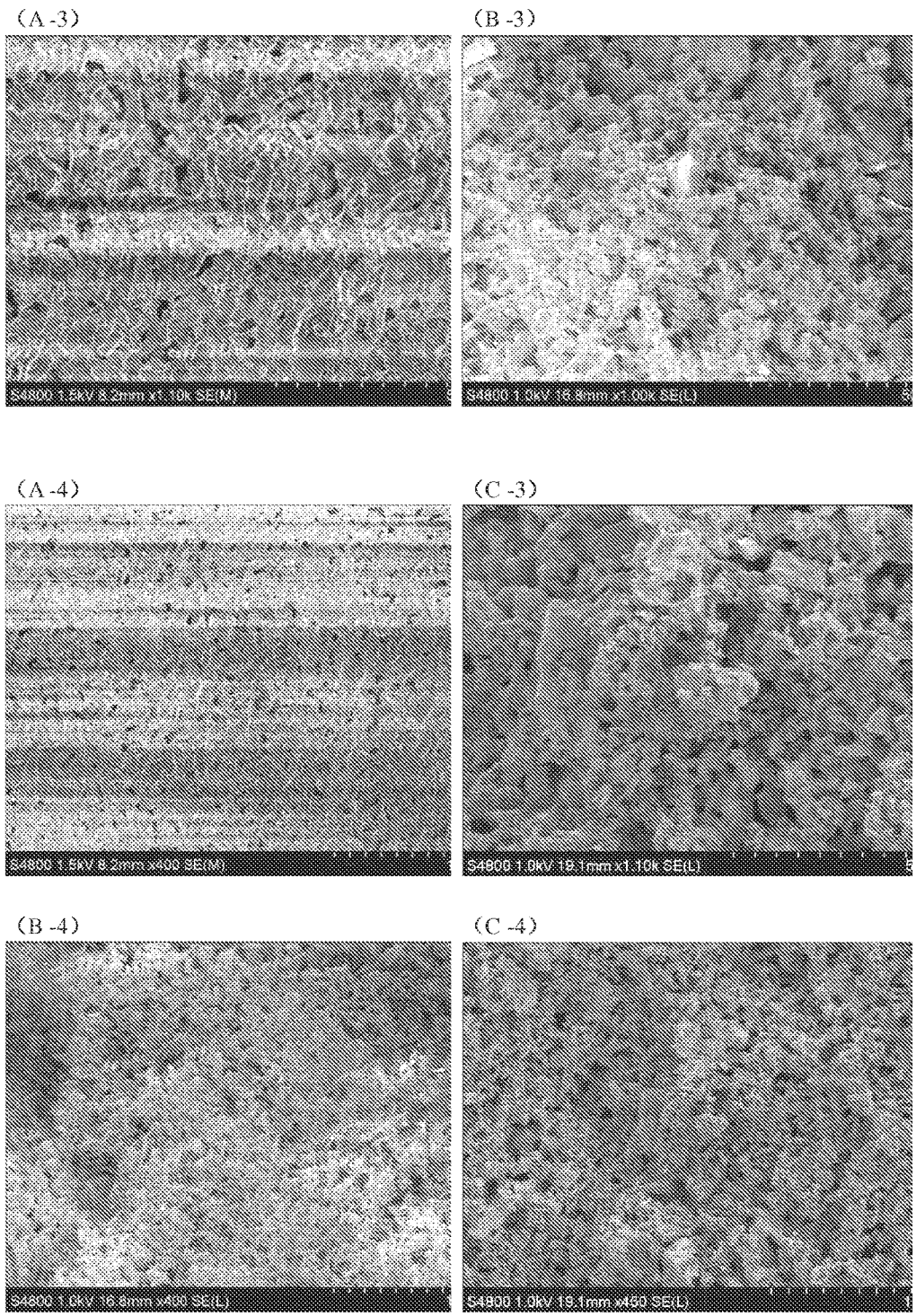

wherein: (A-1): porous ceramic substrate (5 μm scaleplate); (A-2): porous ceramic substrate (20 μm scaleplate); (A-3): porous ceramic substrate (50 μm scaleplate); (A-4): porous ceramic substrate (100 μm scaleplate); (B-1): filter material product (5 μm scaleplate); (B-2): filter material product (10 μm scaleplate); (B-3): filter material product (50 μm scaleplate); (B-4): filter material product (100 μm scaleplate); (C-1): filter material product (after water adsorption, 5 μm scaleplate); (C-2): filter material product (after water adsorption, 10 μm scaleplate); (C-3): filter material product (after water adsorption, 50 μm scaleplate); (C-4): filter material product (after water adsorption, 100 μm scaleplate); (2A): filter material product; (2B): filter material product (after water adsorption).

Figure 2:
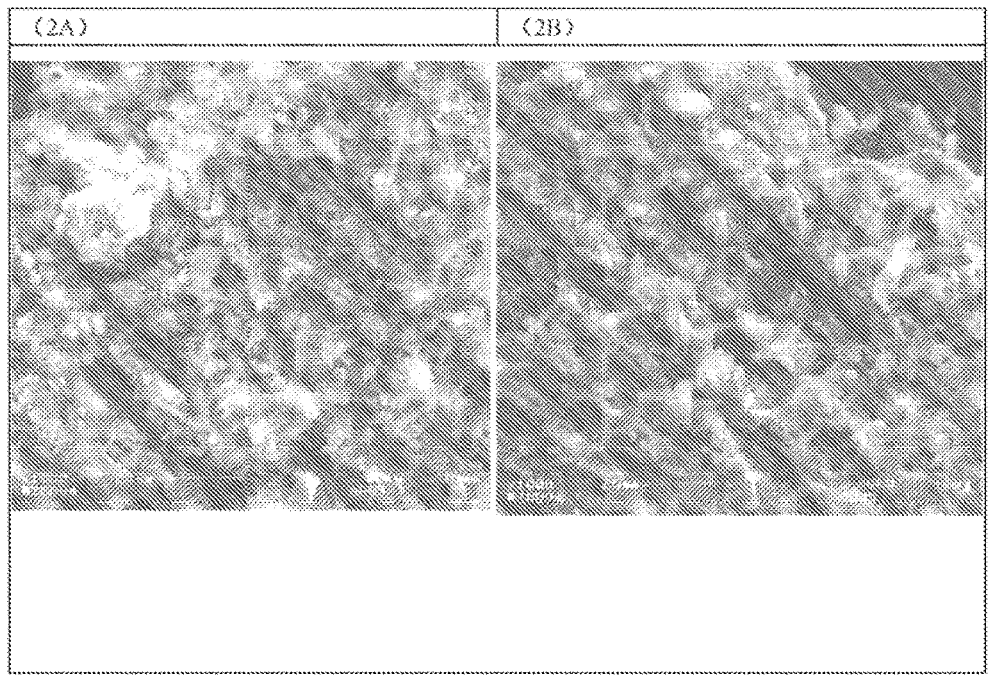

FIG. 2 is a scanning electron microscope graph of the filter material according to embodiment 2.

Figure 3:
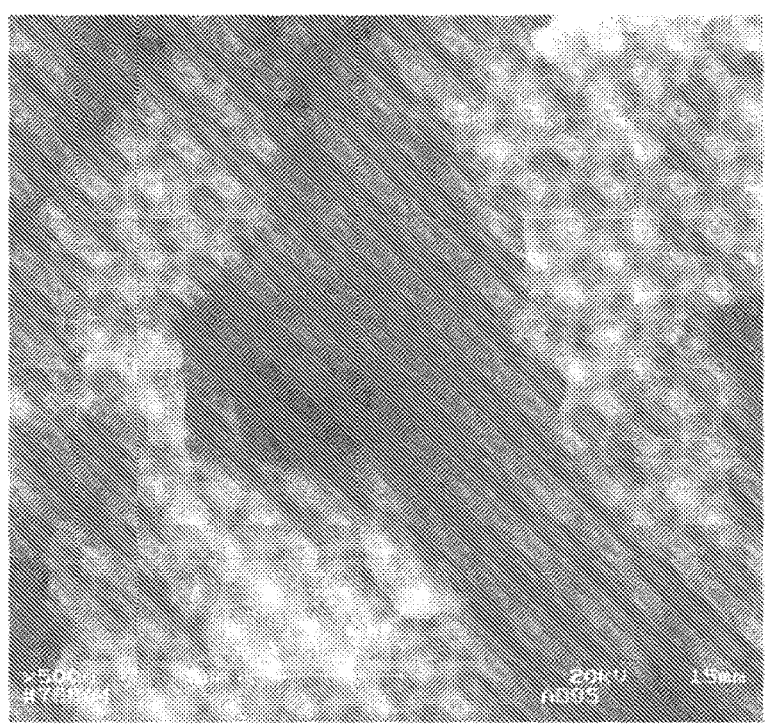

FIG. 3 is a scanning electron microscope graph of a micropore of the filter material according to embodiment 3.

Figure 4:
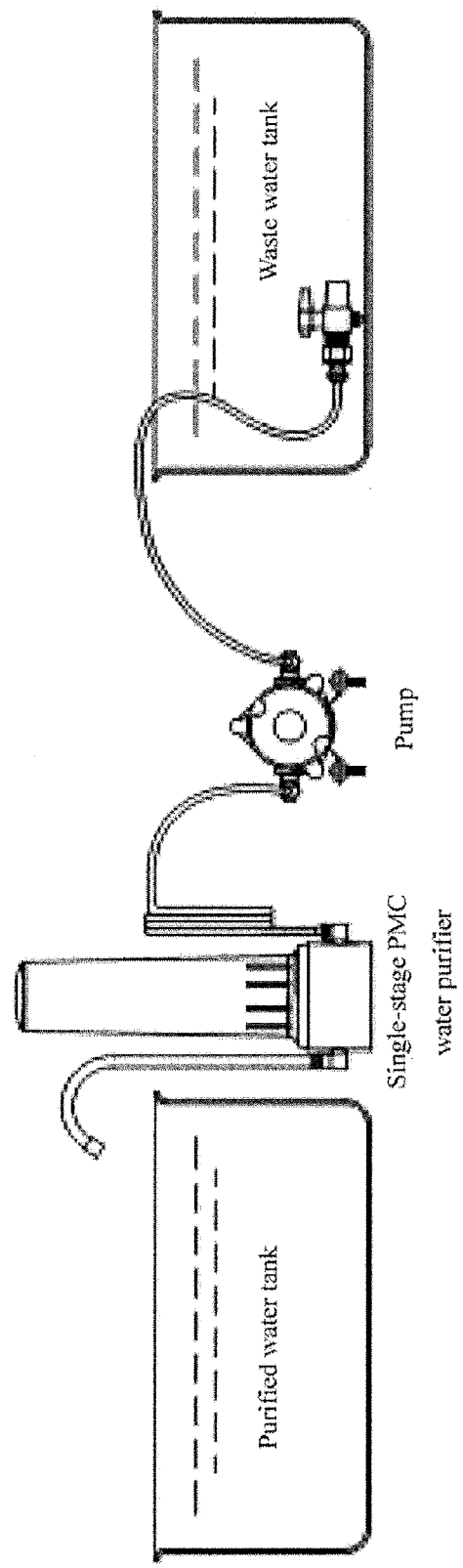

FIG. 4 shows a schematic drawing testing the filter property of the filter material.

DESCRIPTION OF THE PREFERRED EMBODIMENTS

A known common porous ceramic filter, such as a common white diatomaceous earth ceramic filter can filter bacteria in a physical way due to its' developed micropore and excellent permeability, but can't filter heavy metal ions. In the existing method of forming a coating on the ceramic surface, the ceramic can adsorb arsenic and heavy metal ions, but there are problems of easy coating falling off, generating hazardous wastes and non-ideal adsorption effects. The invention is indented to provide a method for generating in-situ nano-scale iron particles within a porous ceramic filter element, the obtained filter material has excellent removal effects for arsenic and heavy metal ions, and the adsorbed arsenic and heavy metal ions are very stable, meanwhile, the problem of falling off of coating is not present in this filter material. Furthermore, in the invention, the component of the porous ceramic substrate and the preparation conditions of the filter material are optimized according to the application fields of the filter material.

The method of nano-scale iron modifying the porous ceramic substrate can be implemented as follows:

step 1: a solution of sugar (such as, glucose or saccharose) or soluble starch of 0.2%-15% was prepared, and sodium citrate was added to adjust pH value to 7-8.0 (preferably weakly alkaline, pH 7.5-8.0,), then ferrous sulphate or ferrous chloride (such as, 0.2%-10%) was added and dissolved completely;

step 2: a porous ceramic substrate (such as, a conventional diatomaceous earth ceramic filter element) was fully immersed into the solution prepared by the step 1 such that it is completely wet, 15 mins later, the substrate was taken out and exposed to air;

step 3: an aqueous solution of sodium borohydride (the content of sodium borohydride is not less than 0.1%) was prepared, completely dissolved, and preferably, tartaric acid solution was added to adjust the pH value to 8.5-9.5, and then the solution was stand-by;

step 4: the aired porous ceramic substrate of the step 2 was rapidly immersed into the aqueous solution of sodium borohydride prepared by the step 3, such that a surface chemical reaction occurs on the ceramic filter element, then the substrate was taken out and aired 1-5 minutes later; and step 5: the aired porous ceramic substrate of the step 4 was heated to 300-500° C. in the atmosphere of nitrogen or hydrogen in an oxygen-free furnace at a heating rate of 80-120° C./h (such as 100° C.), the optimum temperature is 400° C., then the temperature was kept for 0.5-3 hours and the filter material was obtained, finally the substrate was taken out when the temperature was down to less than 120° C.

The physical structure of the filter material prepared by the above method is as follows:

(1) colour: cinereous or steel blue; the fresh section is blue and becomes black in the presence of water (such as, water adsorption or water immersion);

(2) pH: scraping the superficial powder, pH value was tested as 7.2-8.5 according to the NY/T 1377-2007 soil standard;

(3) the section structure of material: shown by the 5000 times electron microscope, micropores of 2-10 μm, there being Si—Fe—C amorphous fluffy structure therein, nano-scale iron structure, forming an infiltrating type of interlayer film after water adsorption.

(4) magnetic test: for Y25(3800GS) magnet, the powder particles less than 0.1 mm can be adsorbed.

It is well known, the nose of a human being or animal is a perfect filter, because it has a particular structure: 1. electrostatic vibrissa adsorbs large particles and dust; 2, the fine fluffy surface within the nasal cavity can adsorb bacteria; 3. the constantly generated nasal mucosa strongly adsorbs or fixes chemical substance. In the microstructure, the porous ceramic substrate (kaolin, diatomaceous earth, bentonite and the like) utilized in the invention loses crystal water after high-temperature calcination to form a porous structure, and can absorb water to be reduced into film-like interlayer structure under a certain condition. Consequently, in the microstructure, the filter material obtained in the invention is configured as a porous and fluffy nose-like filter structure and generates an adsorption film, thereby greatly improving the adsorption efficiency and adapting to changes in water quality and chemical environment.

The invention is further detailedly illustrated in connection with the specific embodiments, but it should be appreciated that the invention is not limited to the following embodiments. Furthermore, the content involved hereinafter means the mass content, without specification.

Embodiment 1

The embodiment 1 provides a filter material for filtering the heavy metal ions of lead, mercury, cadmium and chromium, the preparation method thereof is provided as follows:

step 1: a solution of saccharose was prepared at room temperature, subsequently the aqueous solution of ferrous sulphate was added, and then pH was adjusted to 7.5-8.0 by sodium citrate to obtain an aqueous solution with a saccharose content of 10% and a ferrous ion content of 3%;

step 2: a porous ceramic substrate was fully immersed into the solution prepared by the step 1 such that it is completely wet, 15 mins later, the substrate was taken out and aired for use;

step 3: an aqueous solution of 2.5 wt % sodium borohydride was prepared, and pH value of the solution was adjusted to 8.5-9.5 by a solution of 0.1% tartaric acid, stand-by;

step 4: the aired porous ceramic substrate of the step 2 was rapidly immersed into the aqueous solution of sodium borohydride prepared by the step 3, such that a surface chemical reaction occurs on the ceramic filter element, 5 mins later, the substrate was taken out and aired;

step 5: the aired porous ceramic substrate of the step 4 was heated to 400° C. in the atmosphere of nitrogen or hydrogen in a furnace at a heating rate of 100° C./h, then the temperature was kept for 2 hours and the filter material was obtained, finally the substrate was taken out when the temperature was down to less than 120° C.

In this embodiment, by weight, the used porous ceramic substrate was anaerobically sintered by the following components: 55 portions of diatomaceous earth, 7 portions of calcium bentonite, 4 portions of kaolin, 3 portions of starch, 14 portions of carbon powder, 2 portions of liquid wax and 2 portions of iron powder, the sintering temperature is 400° C. The porosity of the porous ceramic substrate is 70%, pH is 7.5, the colour is white, and the final blank is shaped into 1-2 mm spherical.

The physical properties and structure of the filter material obtained in this embodiment 1 are as follows:

(1) colour: cinereous or steel blue; the fresh section is blue and becomes black in the presence of water (such as, water adsorption or water immersion), shape: 1-2 mm spherical;

(2) pH: scraping the superficial powder, and pH value was tested as 7.8-8.0 according to the NY/T 1377-2007 soil standard.

(3) the section structure of material: shown by the 5000 times electron microscope, micropores of 2-10 μm, there being Si—Fe—C amorphous fluffy structure therein, the nano-scale iron structure, forming an infiltrating type of interlayer film (as shown in FIG. 1) after water adsorption.

(4) magnetic test: for Y25 (3800GS) magnet, the powder particles less than 0.1 mm can be adsorbed.

The filtering effects of the filter material of this embodiment on drinking water:

1. Test Method

Removal efficiency of lead, arsenic and chromium: with reference to MOH <Sanitary Standard for Hygienic Safety and Function Evaluation on Treatment Devices of Drinking Water-General Device> & EPA200.8 ICP/MS;

Removal efficiency of mercury: with reference to MOH <Sanitary Standard for Hygienic Safety and Function Evaluation on Treatment Devices of Drinking Water-General Device> & GB/T 5750.6-2006 standard examination methods for drinking water-metal parameters, atomic fluorescence spectrometry;

Removal efficiency of hexavalent chromium: with reference to MOH <Sanitary Standard for Hygienic Safety and Function Evaluation on Treatment Devices of Drinking Water-General Device> & GB/T 5750.6-2006 standard examination methods for drinking water-metal parameters;

Schematic drawing for testing is as shown in FIG. 4.

2. Test Results: as listed in table 1

TABLE 1

| Test Items | Test Methods | Test Results Raw Water | Test Results Filtered Water | Removal efficiency (%) |
|---|---|---|---|---|
| Arsenic mg/L | EPA200.8ICP/MS | 0.1 | <0.001 | 99.0 |
| Lead mg/L | EPA200.8ICP/MS | 0.12 | <0.001 | 99.2 |
| Mercury mg/L | GB/T 5750.6-2006 | 0.013 | <0.0002 | 98.5 |
| Cadmium mg/L | EPA200.8ICP/MS | 0.06 | <0.001 | 98.3 |
| Hexavalent Chromium mg/L | GB/T 5750.6-2006 | 0.55 | 0.011 | 98.0 |

Stability test of the filter material obtained by this embodiment after use:

Simulation test is performed according to the international standard: EPA TCLP CD-ROM 1311-1 July 1992 METHOD 1311 TOXICITY CHARACTERISTIC LEACHING PROCEDURE.

Test results: the adsorbed heavy metals, such as arsenic, cadmium, mercury and lead, do not exceed or are not detected.

Embodiment 2

The embodiment 2 provides a filter material for filtering arsenic and the heavy metal ions of lead, mercury, cadmium and chromium, the preparation method thereof is provided as follows:

step 1: a solution of soluble starch was prepared at room temperature, subsequently the aqueous solution of ferrous chloride was added, and then pH was adjusted to 7.5-8.0 by sodium citrate to obtain an aqueous solution with a starch content of 5% and a ferrous ion content of 2%;

step 2: a porous ceramic substrate was fully immersed into the solution prepared by the step 1 such that it is completely wet, 15 mins later, the substrate was taken out and aired for use;

step 3: an aqueous solution of 2 wt % sodium borohydride was prepared, and pH value of the solution was adjusted to 8.5-9.5 by a solution of 0.1% tartaric acid, stand-by;

step 4: the aired porous ceramic substrate of the step 2 was rapidly immersed into the aqueous solution of sodium borohydride prepared by the step 3, such that a surface chemical reaction occurs on the ceramic filter element, 5 mins later, the substrate was taken out and aired; and step 5: the aired porous ceramic substrate of the step 4 was heated to 400° C. in the atmosphere of nitrogen or hydrogen in a furnace at a heating rate of 90° C./h, then the temperature was kept for 2 hours and the filter material was obtained, finally the substrate was taken out when the temperature was down to less than 120° C.

In this embodiment 2, by weight, the used porous ceramic substrate was anaerobically sintered by the following components: 80 portions of diatomaceous earth, 2 portions of calcium bentonite, 5 portions of kaolin, and 10 portions of carbon powder, the sintering temperature is 800° C. The porosity of the porous ceramic substrate is 65%, pH is 8.5, the colour is cinereous, and the final blank is shaped as tubular, having a single opening, with a length of 200 mm, an external diameter of 40 mm and an inner diameter of 33 mm.

The physical properties and structure of the filter material obtained in this embodiment 2 are as follows:

(1) colour: cinereous or steel blue; the fresh section is blue and becomes black in the presence of water (such as, water adsorption or water immersion), shape: a filter element with an external diameter of 40 mm, an inner diameter of 35 mm and a length of 200 mm;

(2) pH: scraping the superficial powder, and pH value was tested as 8.3-8.5 according to the NY/T 1377-2007 soil standard;

(3) the section structure of material: shown by the 5000 times electron microscope, micropores of 2-10 μm, there being Si—Fe—C amorphous fluffy structure therein, the nano-scale iron structure, forming an infiltrating type of interlayer film (as shown in FIG. 2) after water adsorption;

(4) magnetic test: for Y25 (3800GS) magnet, the powder particles less than 0.1 mm can be adsorbed.

The filtering effects of the filter material of this embodiment 2 on drinking water:

1. Test Method

Removal rate of arsenic and chromium: with reference to MOH <Sanitary Standard for Hygienic Safety and Function Evaluation on Treatment Devices of Drinking Water-General Device> & EPA200.8 ICP/MS.

Removal rate of mercury: with reference to MOH <Sanitary Standard for Hygienic Safety and Function Evaluation on Treatment Devices of Drinking Water-General Device> & GB/T 5750.6-2006 Standard examination methods for drinking water-metal parameters, atomic fluorescence spectrometry.

Schematic drawing for testing is as shown in FIG. 4.

2. Test Results: as listed in table 2.

TABLE 2

| Test Items | | | | | | | | | |
|---|---|---|---|---|---|---|---|---|---|
| | | Element Heavy Metals | | | | | | | |
| Sample | Unit | As ppb | Pb ppb | Cr ppb | Cd ppb | Hg ppb | pH | Chromaticity | Note |
| flooding water 1.1 effluent water 1.1.1 | flow 1.2 L/min | | | | <0.2 | <0.2 | 6-6.5 7-7.5 | colourless nearly colourless | Wahaha purified water Batch 2 (2012 Dec. 15) |

TABLE 2-continued

| | | Element Heavy Metals | | | | | | | |
|---|---|---|---|---|---|---|---|---|---|
| Sample | Unit | As ppb | Pb ppb | Cr ppb | Cd ppb | Hg ppb | pH | Chromaticity | Note |
| effluent water 1.1.2 | flow 1.2 L/min | | | | <0.2 | <0.2 | 7-7.5 | nearly colourless | Batch 2, modified, (2012 Dec. 15) |
| effluent water 1.1.3 | flow 1.2 L/min | | | | <0.2 | <0.2 | 7-7.5 | slight yellow | Batch 1 (2012 Dec. 11) |
| effluent water 1.1.4 | flow 1.2 L/min | | | | <0.2 | <0.2 | 6-7.0 | black water at the begining | shekang black ceramic (unknown time, no micronose addition), no obvious change in pH of flooding and effluent water |

Stability test of the filter material obtained by this embodiment after use:

Simulation test is performed according to the international standard: EPA TCLP CD-ROM 1311-1 July 1992 METHOD 1311 TOXICITY CHARACTERISTIC LEACHING PROCEDURE.

Test results: the adsorbed heavy metals, such as arsenic, cadmium, mercury, lead and cadmium, do not exceed or are not detected.

Embodiment 3

This embodiment 3 provides a filter material for treating waste water containing arsenic, selenium metals and heavy metals, the preparation method thereof is provided as follows:

step 1: a solution of soluble starch was prepared at room temperature, subsequently the aqueous solution of ferrous sulphate was added, and then pH was adjusted to 7.5-8.0 by sodium citrate to obtain an aqueous solution with a starch content of 5% and a ferrous ion content of 4%;

step 2: a porous ceramic substrate was fully immersed into the solution prepared by the step 1 such that it is completely wet, 15 mins later, the substrate was taken out and exposed to air;

step 3: an aqueous solution of 4 wt % sodium borohydride was prepared, and pH value of the solution was adjusted to 8.5-9.5 by a solution of 0.1% tartaric acid, stand-by;

step 4: the aired porous ceramic substrate of the step 2 was rapidly immersed into the aqueous solution of sodium borohydride prepared by the step 3, such that a surface chemical reaction occurs on the ceramic filter element, 5 mins later, the substrate was taken out and aired;

step 5: the aired porous ceramic substrate of the step 4 was heated to 380° C. in the atmosphere of nitrogen or hydrogen in a furnace at a heating rate of 100° C./h, then the temperature was kept for 2.5 hours and the filter material was obtained, finally the substrate was taken out when the temperature was down to less than 120° C.

In this embodiment, by weight, the used porous ceramic substrate was anaerobically sintered by the following components: 60 portions of diatomaceous earth, 13 portions of calcium bentonite, 5 portions of kaolin, 10 portions of carbon powder and 2.5 portions of starch, the sintering temperature is 980° C. The porosity of the porous ceramic substrate is 62%, pH is 8, and the colour is black.

The physical properties and structure of the filter material obtained in this embodiment 3 are as follows:

(1) colour: cinereous or steel blue; the fresh section is blue and becomes black in the presence of water (such as, water adsorption or water immersion), shape: a filter element with an external diameter of 40 mm, an inner diameter of 35 mm and a length of 200 mm;

(2) pH: scraping the superficial powder, and pH value was tested as 8.1-8.3 according to the NY/T 1377-2007 soil standard;

(3) the section structure of material: shown by the 5000 times electron microscope, micropores of 2-10 μm, there being Si—Fe—C amorphous fluffy structure therein, the nano-scale iron structure, forming a infiltrating type of interlayer film (as shown in FIG. 3) after water adsorption;

(4) magnetic test: for Y25 (3800GS) magnet, the powder particles less than 0.1 mm can be adsorbed.

The filtering effects of the filter material of this embodiment on waste water:

1. Waster Water Sample: Hawaii AlaWai canal water.

2. Test Method: referring to the schematic drawing for testing shown in FIG. 4, the waste water passes a water purifier provided with the filter material for 9.5 mins, and the concentration of flooding water was tested.

3. Test Results: as listed in table 3. It is shown that the filter material has excellent removal effects on cadmium, cobalt, strontium, copper, nickel, zinc, and silver ions. Isothermal adsorption test is performed for this water, and the comprehensive adsorption capacity is 5 mg/L for complex metal ions.

TABLE 3

| | Heavy Metal Element | | | | | | | | | |
|---|---|---|---|---|---|---|---|---|---|---|
| | Mn | Zn | Cu | Ag | As | Cd | Co | Cr | Ni | Pb | Se |
| Concentration of Flooding Water (ppm) | 0.164 | 0.008 | 0.027 | 0.100 | 0.032 | 0.011 | 0.049 | 0.174 | 0.048 | 0.011 | 0.062 |

TABLE 3-continued

| | Heavy Metal Element | | | | | | | | | |
|---|---|---|---|---|---|---|---|---|---|---|
| | Mn | Zn | Cu | Ag | As | Cd | Co | Cr | Ni | Pb | Se |
| Concentration of Effulent Water (ppm) | 0.024 | 0.003 | 0.013 | 0.022 | 0.003 | 0.004 | 0.002 | 0.006 | 0.009 | 0.001 | 0.011 |
| Removal rate (%) | 86 | 67 | 52 | 78 | 90 | 59 | 96 | 97 | 82 | 87 | 81 |

Stability test of the filter material obtained by this embodiment after use:

Simulation test is performed according to the international standard: EPA TCLP CD-ROM 1311-1 July 1992 METHOD 1311 TOXICITY CHARACTERISTIC LEACHING PROCEDURE.

Test results: the adsorbed heavy metals, such as arsenic, cadmium, mercury and lead, do not exceed or are not detected.

The above embodiments are described for illustrating the technical concept and features of invention, the aim is intended to enable a person skilled in the art to appreciate the content of the invention and further implement it, and the protecting scope of the invention can not be limited hereby. Also, any equivalent variations or modifications made according to the spirit of the invention should be covered within the protecting scope of the invention.

What is claimed is:

1. A filter material having a function of adsorbing and fixing arsenic and heavy metals, comprising
    a porous ceramic substrate with a porosity of 35%-85%; and
    zero-valent iron nanoparticles formed in situ within the porous ceramic substrate;
    wherein the porous ceramic substrate has micropores of 2-10 micron, a fluffy amorphous silicon-iron-carbon structure containing silicon, the zero-valent iron nanoparticles, and carbon is formed within each micropore and the fluffy amorphous silicon-iron-carbon is able to form an adsorption film after water absorption, and at least 25 wt % of the ceramic component constituting the porous ceramic substrate is diatomaceous earth.

2. The filter material having a function of adsorbing and fixing arsenic and heavy metals as claimed in claim 1, wherein the surface of the filter material is steel blue or cinereous, a fresh section of the filter material is blue and the filter material becomes black after water absorption or water immersion.

3. The filter material having a function of adsorbing and fixing arsenic and heavy metals as claimed in claim 1, wherein the ceramic component constituting the porous ceramic substrate is diatomaceous earth, or any combination of diatomaceous earth and one or two of kaolin and bentonite.

4. The filter material having a function of adsorbing and fixing arsenic and heavy metals as claimed in claim 1, wherein the porosity of the porous ceramic substrate is 50-70%.

5. The filter material having a function of adsorbing and fixing arsenic and heavy metals as claimed in claim 1, wherein the filter material is obtained by nano-scale iron modifying the porous ceramic substrate, the method of nano-scale iron modifying comprising steps of: adsorbing ferrous ions on the porous ceramic substrate, then utilizing a reducing agent to reduce in situ the ferrous ions adsorbed on the porous ceramic substrate, and finally sintering anaerobically the porous ceramic substrate at 300-500° C.

6. The filter material having a function of adsorbing and fixing arsenic and heavy metals as claimed in claim 5, wherein the filter material is prepared by the steps of:
    (1) immersing the porous ceramic substrate in an aqueous mixed solution of pH 7.0-8.0 containing ferrous ions and a tackifier, then taking out the porous ceramic substrate after the porous ceramic substrate being completely wet and exposed to air;
    (2) immersing the porous ceramic substrate of the step (1) in an aqueous solution of pH 8.5-9.5 containing 0.1 wt %-5 wt % of sodium borohydride, and taking out the porous ceramic substrate 2-8 mins later and exposed to air; and
    (3) placing the porous ceramic substrate of the step (2) into an oxygen-free furnace to sinter anaerobically, and heating up to 300° C.-500° C. by a temperature increase rate of 80-100° C./h, then keeping the temperature for 0.5-3 hours to obtain the filter material having a function of adsorbing and fixing arsenic and heavy metals.

7. The filter material having a function of adsorbing and fixing arsenic and heavy metals as claimed in claim 6, wherein
    in the step (1), the tackifier is selected from the group of glucose, saccharose, soluble starch or any combination thereof, and the content of the tackifier in the aqueous mixed solution is 0.2 wt %-15 wt %;
    in the step (2), the content of sodium borohydride in the aqueous solution is 2 wt %-5 wt %; and
    in the step (3), the sintering is performed in the atmosphere of nitrogen or hydrogen.

8. The filter material having a function of adsorbing and fixing arsenic and heavy metal as claimed in claim 6, wherein in the step (3), the sintering temperature is 380-420° C.

9. The filter material having a function of adsorbing and fixing arsenic and heavy metals as claimed in claim 1, wherein the filter material is shaped as spherical particles, columnar particles or hollow filter element.

10. A method for removing trivalent arsenic, pentavalent arsenic and heavy metal ions from water, comprising a step of passing waste water through a water purifier provided with the filter material as claimed in claim 1.

11. A method for preparing the filter material having a function of adsorbing and fixing arsenic and heavy metals as claimed in claim 1, comprising
    (1) immersing the porous ceramic substrate in an aqueous mixed solution of pH 7.0-8.0 containing ferrous ions and a tackifier, then taking out the porous ceramic substrate after the porous ceramic substrate being completely wet and exposed to air, wherein the porosity of the porous ceramic substrate is 35%-85%, and at least 25 wt % of the ceramic component constituting the porous ceramic substrate is diatomaceous earth;

(2) immersing the porous ceramic substrate of the step (1) in an aqueous solution of pH 8.5-9.5 containing 0.1 wt %-5 wt % of sodium borohydride, and taking out the porous ceramic substrate 2-8 mins later and exposed to air; and (3) placing the porous ceramic substrate of the step (2) into an oxygen-free furnace to sinter anaerobically, and heating up to 300° C.-500° C. by a rate of temperature increase of 80-100° C./h, then keeping the temperature for 0.5-3 hours to obtain the filter material having a function of adsorbing and fixing arsenic and heavy metal.

12. The method as claimed in claim 11, wherein in the step (1), the tackifier is selected from the group of glucose, saccharose, soluble starch or any combination thereof, and the content of the tackifier in the aqueous mixed solution is 0.2 wt %-15 wt %.

13. The method as claimed in claim 11, wherein in the step (1), the content of the ferrous ions in the aqueous mixed solution is 0.1 wt %-5 wt %.

14. The method as claimed in claim 13, wherein in the step (1), the content of the ferrous ions in the aqueous mixed solution is 0.2 wt %-2 wt %.

15. The method as claimed in claim 11, wherein in the step (2), the content of sodium borohydride in the aqueous solution is 2 wt %-5 wt %.

16. The method as claimed in claim 11, wherein in the step (1), pH value is adjusted by sodium citrate, and in the step (2), pH value is adjusted by tartaric acid.

17. The method as claimed in claim 11, wherein in the step (3), the sintering is performed in the atmosphere of nitrogen or hydrogen.

18. The method as claimed in claim 11, in the step (3), the sintering temperature is 380-420° C.

19. The method as claimed in claim 11, wherein the ceramic component constituting the porous ceramic substrate is diatomaceous earth, or any combination of diatomaceous earth and one or two of kaolin and bentonite.

20. The method as claimed in claim 11, wherein the porosity of the porous ceramic substrate is 50%-70%.

* * * * *